(12) United States Patent     (10) Patent No.: US 8,214,178 B2
Cone     (45) Date of Patent: Jul. 3, 2012

(54) METHOD AND SYSTEM FOR OPTIMIZING THE VIBRATIONAL CHARACTERISTICS OF A STRUCTURE

(75) Inventor: Michael Cone, Kihei, HI (US)

(73) Assignee: Vibration Technologies, LLC, San Rafael, CA (US)

( * ) Notice: Subject to any disclaimer, the term of this patent is extended or adjusted under 35 U.S.C. 154(b) by 427 days.

(21) Appl. No.: 12/477,071

(22) Filed: Jun. 2, 2009

(65) Prior Publication Data

US 2009/0306802 A1     Dec. 10, 2009

Related U.S. Application Data

(60) Provisional application No. 61/058,730, filed on Jun. 4, 2008.

(51) Int. Cl.
*G06F 17/50* (2006.01)
*G06F 7/60* (2006.01)
*G06F 17/10* (2006.01)
*G06F 19/00* (2011.01)
*G05D 7/00* (2006.01)
*G05D 11/00* (2006.01)

(52) U.S. Cl. .............. 703/1; 703/2; 700/173; 700/182; 700/280; 702/56

(58) Field of Classification Search .............. 700/28–30, 700/97–98, 173, 182, 280; 703/1–2; 702/56; 318/561
See application file for complete search history.

(56) References Cited

U.S. PATENT DOCUMENTS

| | | | | |
|---|---|---|---|---|
| 5,036,633 | A * | 8/1991 | Kobori et al. | 52/1 |
| 5,311,709 | A * | 5/1994 | Kobori et al. | 52/167.2 |
| 5,526,609 | A * | 6/1996 | Lee et al. | 52/1 |
| 5,592,791 | A * | 1/1997 | D'Annunzio et al. | 52/167.2 |
| 6,032,552 | A * | 3/2000 | Alleai | 74/574.4 |
| 6,298,279 | B1 * | 10/2001 | Shimada et al. | 700/182 |
| 6,666,108 | B1 * | 12/2003 | Alleai | 248/559 |
| 6,684,255 | B1 * | 1/2004 | Martin | 709/231 |
| 6,871,565 | B2 * | 3/2005 | Allaei | 248/559 |
| 6,935,206 | B2 * | 8/2005 | Alleai | 703/7 |
| 7,656,401 | B2 * | 2/2010 | D'Amora | 345/419 |
| 7,774,080 | B2 * | 8/2010 | Holzner et al. | 700/97 |
| 7,930,058 | B2 * | 4/2011 | Bhagavat et al. | 700/164 |

OTHER PUBLICATIONS

PCT Search Report for PCT/US09/46117 dtd Jul. 31, 2009.

* cited by examiner

*Primary Examiner* — Ramesh Patel

(74) *Attorney, Agent, or Firm* — Patterson & Sheridan, LLP

(57) ABSTRACT

A structural optimization engine generates a response profile based on a vibrational analysis of a three-dimensional (3D) structure. The structural optimization engine determines whether the 3D structure complies with one or more design goals set for the 3D structure based on the response profile. When the 3D structure does not comply with the design goals, the structural optimization engine retrieves dependency data from a structure database. The dependency data indicates various dependencies between response characteristics included in the response profile and specific regions of the 3D model. Based on the dependency data, the structural optimization engine determines structural modifications that can be made to the 3D structure to bring the 3D structure into compliance with the design goals. A multi-axis computer-aided manufacturing unit then makes the structural modifications to the 3D structure.

17 Claims, 7 Drawing Sheets

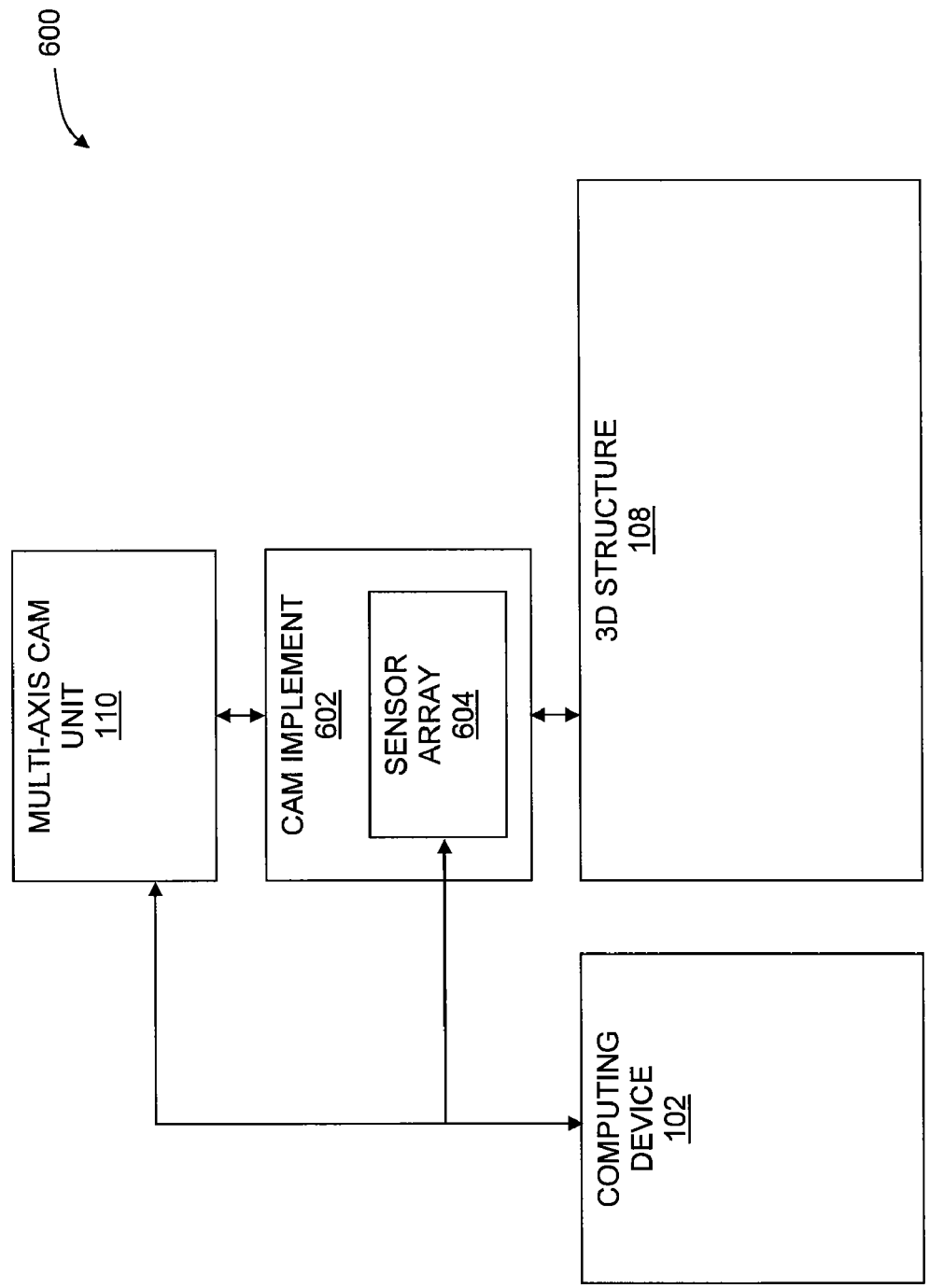

METHOD AND SYSTEM FOR OPTIMIZING THE VIBRATIONAL CHARACTERISTICS OF A STRUCTURE

CROSS-REFERENCE TO RELATED APPLICATIONS

This application claims the priority benefit of Provisional U.S. Patent Application Ser. No. 61/058,730, filed Jun. 4, 2008, the subject matter of which is hereby incorporated herein by reference.

BACKGROUND OF THE INVENTION

1. Field of the Invention

The invention relates generally to the design and manufacture of structures and, more specifically, to a method and system for optimizing the vibrational characteristics of a structure.

2. Description of the Related Art

Conventional structural analysis techniques can be used to manufacture and/or modify a wide range of different structures, including musical instruments, buildings, airframes, surfboards, and missiles, among other things. A designer of a structure may implement one or more different structural analysis techniques to design and build the structure to have particular vibrational characteristics. For example, a designer of a guitar may implement a shaker coupled to the guitar to perform an acoustic sweep of the guitar. One or more sensors may then record data indicative of the vibrational characteristics of the guitar. Based on the recordations performed by the sensors, the designer of the guitar may then make structural modifications to the guitar in order to manipulate the vibrational characteristics of the guitar.

One drawback of conventional techniques is that a designer of a structure typically must rely on trial-and-error to modify the structure such that the structure has particular vibrational characteristics. The trial-and-error process is quite time-consuming for the designer. Such an approach is also unpredictable and, therefore, does not produce reliable results. Another drawback of conventional techniques is that the designer of the structure cannot identify particular structural modifications that result in particular changes to the vibrational characteristics of the structure. Returning to the example above, the designer of a guitar could not easily identify a specific structural modification to perform on the guitar in order to modify the amplitude of a particular frequency associated with the guitar. Thus, the designer could not easily or effectively fine-tune the structure of the guitar.

As the foregoing illustrates, what is needed in the art is a more effective way to analyze and design a structure having particularized vibrational characteristics.

SUMMARY OF THE INVENTION

One embodiment of the present invention sets forth a computer-implemented method for optimizing the vibrational characteristics of a three-dimensional (3D) structure. The method includes the steps of imparting an excitation input to the 3D structure, measuring a dynamic response produced by the 3D structure, determining that the 3D structure does not comply with one or more design goals set for the 3D structure, determining at least one structural modification to be made to the 3D structure to bring the 3D structure into compliance with the one or more design goals, and causing a multi-axis computer-aided manufacturing (CAM) unit to make the at least one structural modification to the 3D structure.

Advantageously, a 3D structure having precise vibrational characteristics can be generated. The 3D structure can be modified until the 3D structure complies with design goals set for the 3D structure. In addition, specific vibrational characteristics of the 3D structure can be identified and manipulated by making precise structural modifications to the 3D structure, thereby allowing the 3D structure to be fine-tuned.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIG. 6 is a conceptual diagram of another system configured to implement one or more aspects of the invention.

DETAILED DESCRIPTION

In the following description, numerous specific details are set forth to provide a more thorough understanding of the invention. However, it will be apparent to one of skill in the art that the invention may be practiced without one or more of these specific details. In other instances, well-known features have not been described in order to avoid obscuring the invention.

Figure 1:
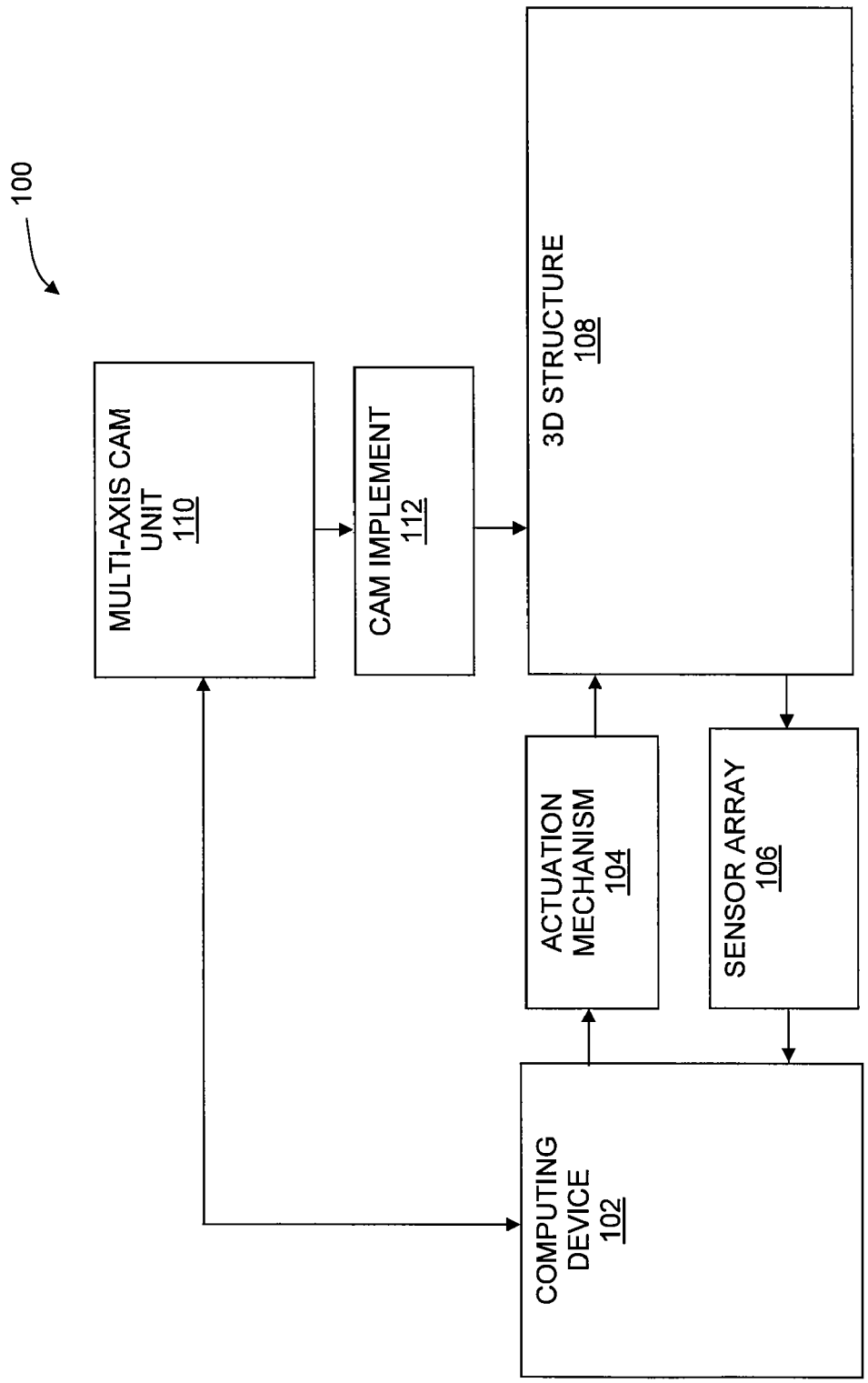
FIG. 1 is a conceptual diagram of a system configured to implement one or more aspects of the invention.

FIG. 1 is a conceptual diagram of a system 100 configured to implement one or more aspects of the invention. As shown, the system 100 includes a computing device 102, an actuation mechanism 104, a sensor array 106, a three-dimensional (3D) structure 108, a multi-axis computer-aided manufacturing (CAM) unit 110, and a CAM implement 112.

The computing device 102 may be any type of computing device, including a desktop computer or a laptop computer, among others. The computing device 102 is coupled to the actuation mechanism 104, the sensor array 106, and the multi-axis CAM unit 110. The computing device 102 is configured to receive data from the sensor array 106 and to transmit commands to the multi-axis CAM unit 110 and to the actuation mechanism 104.

The actuation mechanism 104 is configured to be physically coupled to the 3D structure 108 and to impart an excitation input to the 3D structure 108 based on control signals received from the computing device 102. The actuation mechanism 104 may be a shaker, a force hammer, a loudspeaker, or any other type of mechanism configured to impart an excitation input to the 3D structure 108, and may be electrically-driven, magnetically-driven, manually-driven, pneumatically-driven, or driven in any technically feasible fashion. The actuation mechanism is configured to impart the excitation input to the 3D structure 108 with one or more frequencies having various amplitudes. For example, if the actuation mechanism 104 is a shaker coupled directly to the 3D structure 108, then the shaker could impart a force on the 3D structure 108 with one or more frequencies having various amplitudes. Alternatively, if the actuation mechanism 104 is a force hammer, then the force hammer could impart an impulse force on the 3D structure 108 having a particular amplitude. The actuation mechanism 104 is configured to generate a variety of excitation inputs having a wide range of frequencies and/or amplitudes and to impart those excitation forces to any part of the 3D structure 108. In one embodiment, the actuation mechanism 104 generates an excitation input that is non-destructive to the 3D structure 108 such as, for example, an acoustic scan.

The 3D structure 108 could be any physical structure, including a musical instrument, a loudspeaker, a microphone, a transducer, an engine, a turbine, a turbine blade, an airframe, a propeller blade, a helicopter blade, a boat hull, a spar, a mast, a bicycle frame, a motorcycle frame, an automobile chassis, an automobile suspension, a building, a spacecraft, a wheel, a bearing, a hang glider, a paraglider, a skateboard, a snowboard, a surfboard, a windsurfing board, a kiteboard, a ski, a tennis racquet, a golf club, a sword, an electric motor, an electric generator, a submarine, a rocket, a missile, an ultralight aircraft, a suspension bridge, a machine, an I-beam, a wing, or a firearm, among others. Additionally, the 3D structure 108 may be composed of any material or combination of materials, including wood, steel, carbon fiber, plastic, iron, stone, titanium, or silicon, among others.

When the actuation mechanism 104 imparts the excitation input to the 3D structure 108, the 3D structure 108 produces a dynamic response. The sensor array 106 includes one or more sensors that may be physically coupled to the 3D structure 108 and configured to record a particular quantity associated with the dynamic response produced by the 3D structure 108. For example, the sensors could include one or more accelerometers that are each physically coupled to a particular location on the surface of the 3D structure 108 and configured to record the acceleration of that particular location. The sensors in the sensor array 106 may also be located at a distance from the 3D structure 108. For example, the sensor array 106 could include one or more microphones located at a distance from the 3D structure 108 and configured to record the acoustic output of the 3D structure 108 when the 3D structure 108 produces the dynamic response. The sensor array may further include one or more strain gauges, force gauges, or air velocity sensors, among others. Those skilled in the art will recognize that a wide variety of sensors and various combinations of sensors may be implemented to record different characteristics of the dynamic response produced by the 3D structure 108.

Based on the recordations performed by the sensors, the sensor array 106 generates "sensor data," which is real-time data that reflects the real-time dynamic response produced by the 3D structure 108. The sensor data may include acceleration values, amplitude values, strain values, force values, or air velocity values, as well as corresponding time values, among others, depending on the types of sensors included in the sensor array 106. The sensor array 106 outputs the sensor data to the computing device 102.

As described in greater detail below in FIGS. 2-5, the computing device 102 may then determine structural modifications to be made to the 3D structure 108 in order to bring the 3D structure 108 into compliance with one or more "design goals" determined by the designer of the 3D structure 108. As referred to herein, the design goals set for the 3D structure 108 include desired vibrational characteristics of the 3D structure 108, such as, for example, a specific quality factor Q. The computing device 102 may then cause the structural modifications to be made to the 3D structure 108 via the multi-axis CAM unit 110.

The multi-axis CAM unit 110 may be any technically feasible type of multi-axis CAM unit, including a router, a drill press, a band saw, a sander, a water jet cutter, a laser cutter, a lathe, a welding device, or a silicon-deposition machine, among others. Accordingly, the multi-axis CAM unit 110 is configured to add material to or remove material from any real-world 3D structure, such as the 3D structure 108. The multi-axis CAM unit may be a single machine configured to perform multiple manufacturing functions or, alternatively, multiple machines each configured to perform one or more different manufacturing functions. Those skilled in the art will recognize that the multi-axis CAM unit 110 may be any type of manufacturing machine or any combination of manufacturing machines. The multi-axis CAM unit 110 is configured to modify the 3D structure 108 via a CAM implement 112. The CAM implement 112 is controlled by the multi-axis CAM unit 110 and is configured to add material to and/or remove material from the 3D structure 108. For example, if the multi-axis CAM unit 110 is a router, then the CAM implement 112 could be a cutting bit that removes material from the 3D structure 108.

Figure 3:
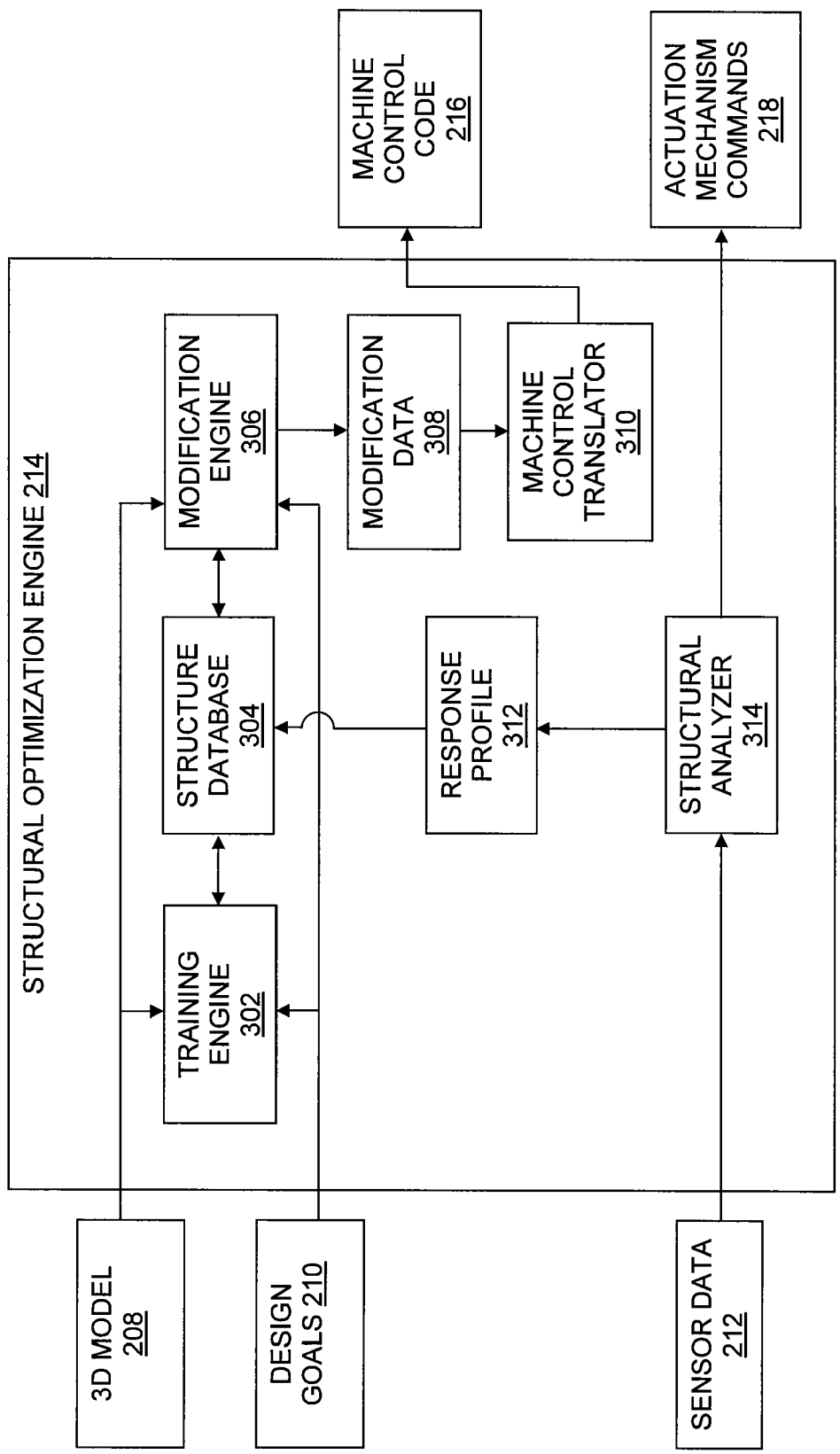
FIG. 3 is a conceptual diagram illustrating the structural optimization engine of FIG. 2 in greater detail, according to one embodiment of the invention.

As further described in FIG. 3, the system 100 may repeatedly impart an excitation input to the 3D structure 108, measure the dynamic response produced by the 3D structure 108, and make structural modifications to the 3D structure 108 until the 3D structure 108 complies with the design goals set for the 3D structure 108.

Figure 2:
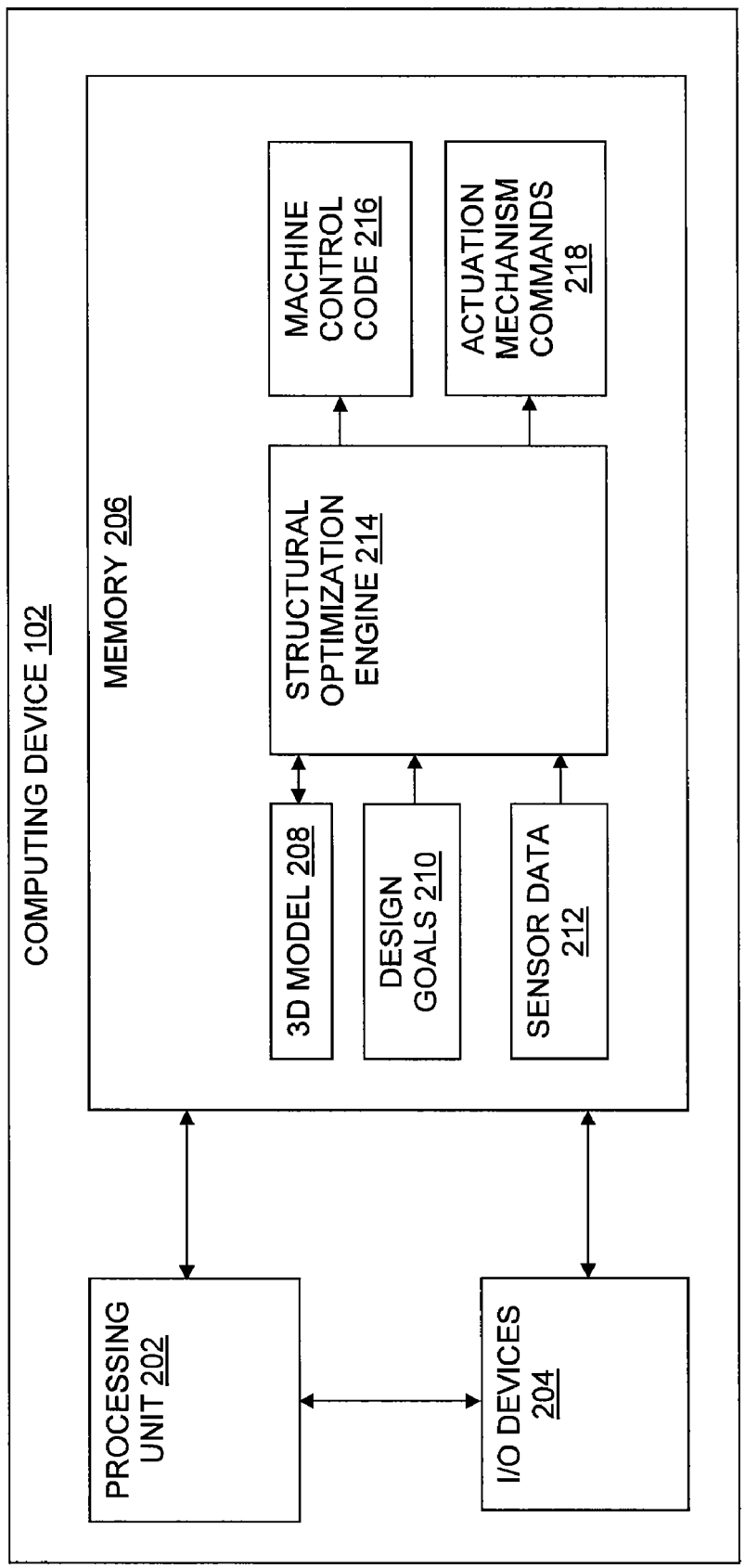
FIG. 2 is a conceptual diagram illustrating the computing device of FIG. 1 in greater detail, according to one embodiment of the invention.

FIG. 2 is a conceptual diagram illustrating the computing device 102 of FIG. 1 in greater detail, according to one embodiment of the invention. As shown, the computing device 102 includes a processing unit 202, input/output (I/O) devices 204, and a memory 206. The processing unit 202 is coupled to the I/O devices 204 and to the memory 206. The I/O devices 204 are coupled to the processing unit 202 and to the memory 206.

The processing unit 202 may be a single-core processor, a multi-core processor, an application-specific integrated circuit (ASIC), a field-programmable gate array (FPGA), a central processing unit (CPU), a graphics processing unit (GPU), or a combination of processing units. The processing unit 202 is configured to execute program instructions stored in the memory 206. The program instructions may include software applications, drivers, and/or operating systems (OSs).

The I/O devices 204 may allow data to be transferred to and from the computing device 102 and may include a keyboard, a mouse, a monitor, a speaker, a switch, a touchscreen, a universal serial bus (USB) port, a firewire port, a serial port, an Ethernet port, a disk drive, a flash drive, or a wireless network card, among others. In one embodiment, the I/O devices 204 can be used to write data to or read data from the memory 206. In another embodiment, the I/O devices 204 may provide a connection to the Internet. In yet another embodiment, the I/O devices 204 may include the sensor array 106 described in FIG. 1.

The memory 206 may be any type of memory unit, including a random-access memory (RAM) unit, a dynamic RAM (DRAM) unit, a hard disk drive, or a flash memory module, among others. The memory 206 includes a 3D model 208, design goals 210, sensor data 212, a structural optimization engine 214, machine control code 216, and actuation mechanism commands 218.

The 3D model 208 is a computer model of the 3D structure 108 described in FIG. 1. The 3D model 208 may be generated using a computer-aided design (CAD) application that operates on the computing device 102 or, alternatively, may be generated elsewhere and then stored in the memory 206. For example, the 3D model 208 could be downloaded from the Internet via the I/O devices 204 and then stored in the memory 208. In one embodiment, the 3D model 208 includes data specifying one or more materials that compose different structural elements of the 3D structure 108.

The design goals 210 specify desired vibrational characteristics of the 3D structure 108. In one embodiment, the design goals 210 include one or more target parameters for the 3D structure 108, such as, for example, a target mass, one or more target dimensions, one or more target impedance/admittance values, one or more target resonant frequencies, a target quality factor Q, a target impulse response, or a target transfer function, among others. The design goals 210 may be generated by the designer via the I/O devices 204 or downloaded from the Internet via the I/O devices 204, among others.

The sensor data 212 includes real-time data output by the sensor array 106. For example, when the sensor array 106 of FIG. 1 includes an accelerometer, the sensor data could include a vector of acceleration data points and a corresponding vector of time data points. Each acceleration data point could indicate an acceleration value measured by the accelerometer at a corresponding time. The sensor data 212 may include real-time data generated by any of the sensors included in the sensor array 106 of FIG. 1.

The structural optimization engine 214 is a software program that, when executed by the processing unit 202, generates the machine control code 216 and the actuation mechanism commands 218, as described in greater detail below in FIG. 3. The actuation mechanism commands 218 are executed by the actuation mechanism 104 to impart different excitation inputs to the 3D structure 108. For example, the actuation mechanism 104 could execute the actuation mechanism commands 218 to impart an impulse force on the 3D structure 108. In another example, the actuation mechanism 104 could execute the actuation mechanism commands 218 to perform an acoustic sweep of the 3D structure 108 across a range of frequencies. The 3D structure 108 receives the excitation input and produces the dynamic response, as previously described herein.

The machine control code 216 may be computational numerical control (CNC) code or G-code, among others. The machine control code 216 is executed by the multi-axis CAM unit 110 to make different structural modifications to the 3D structure 108, including the addition of material to or the removal of material from the 3D structure 108. By making these structural modifications, the multi-axis CAM unit 210 may bring the 3D structure 108 into compliance with the design goals 210.

FIG. 3 is a conceptual diagram illustrating the structural optimization engine 214 of FIG. 2 in greater detail, according to one embodiment of the invention. As shown, the structural optimization engine 214 includes a training engine 302, a structure database 304, a modification engine 306, modification data 308, a machine control translator 310, a response profile 312, and a structural analyzer 314.

The structural analyzer 314 is configured to perform a vibrational analysis on the 3D structure 108. The structural analyzer 314 transmits the actuation mechanism commands 218 to the actuation mechanism 104, thereby causing the actuation mechanism 104 to impart an excitation input to the 3D structure 108. When the 3D structure 108 produces a dynamic response following transmission of the excitation input, the sensor array 106 generates the sensor data 212, as previously described herein. Based on the sensor data 212, the structural analyzer 314 generates the response profile 312.

The response profile 312 includes one or more response characteristics that are based on the dynamic response produced by the 3D structure 108. For example, the response profile 312 could include one or more resonant frequencies, one or more impedance/admittance values, a quality factor Q, a spectral density plot, or a transfer function associated with the 3D structure 108, among others.

In one embodiment, the structural analyzer 314 generates the response profile 312 to include a spectral density plot that relates each frequency in a range of frequencies to a corresponding power output value associated with the 3D structure 108. In order to generate the spectral density plot, the structural analyzer 314 causes the actuation mechanism 104 to perform an acoustic sweep of the 3D structure 108 across the range of frequencies. Based on the sensor data 212 subsequently output by the sensor array 106, the structural analyzer 314 determines a power output value associated with the 3D structure 108 at each of the frequencies in the range of frequencies. The structural analyzer 314 then includes this data in the response profile 312. In a further embodiment, the structural analyzer 314 performs the acoustic sweep across a set of random frequencies.

In another embodiment, the structural analyzer 314 may generate the response profile 312 to include one or more resonant frequencies. In order to identify the one or more resonant frequencies of the 3D structure 108, the structural analyzer 314 causes the actuation mechanism 104 to impart an impulse force on the 3D structure 108. Based on the sensor data 212 output by the sensor array 106, the structural analyzer 314 may identify one or more resonant frequencies associated with the 3D structure 108. The structural analyzer may then include the resonant frequencies in the response profile 312. In a further embodiment, the structural analyzer 314 may generate a response profile 312 that includes a transfer function associated with the 3D structure 108 by comparing the actuation mechanism commands 218 to the sensor data 212.

The structural analyzer 314 is configured to transmit the response profile 312 to the training engine 302 and to the modification engine 306. The modification engine 306 is configured to determine whether the 3D structure 108 complies with the design goals 210. When determining whether the 3D structure 108 complies with the design goals 210, the modification engine 306 determines whether one or more of the response characteristics in the response profile 312 are sufficiently similar to corresponding response characteristics set forth in the design goals 210.

For example, the modification engine 306 could compare the amplitude of a particular resonant frequency in the response profile 312 to the amplitude of a corresponding resonant frequency in the design goals 210. If the difference between the two values is less than a threshold value, then the modification engine 306 would determine that the 3D structure 108 complies with the design goals 210. However, if the difference is greater than a threshold value, then the modification engine 306 would determine that the 3D structure 108 does not comply with the design goals 210. Again, in various embodiments, one response characteristic or multiple response characteristics may be compared in determining whether the 3D structure 108 complies with the design goals 210.

If the modification engine 306 determines that the 3D structure 108 does not comply with the design goals 210, then the modification engine 306 accesses one or more "stored 3D models" residing in the structure database 304 for use in generating the modification data 308 and related machine control code 216, as further described herein. Each stored 3D model is generated using a CAD application and represents a real-world 3D structure, such as the 3D structure 108, capable of being produced by the multi-axis CAM unit 110. The structure database 304 is populated with one or more stored 3D models, each of which may be downloaded from the Internet or transferred to the structure database via the I/O devices 204. Each stored 3D model is associated with "dependency data" that indicates dependencies between the response characteristics of the real-world 3D structure represented by the stored 3D model and the amounts of the different materials in specific regions of the real-world 3D structure. The dependency data accounts not only for the physical dimensions of the specific regions of the real-world 3D structure, but also for the properties of the different materials found in the specific regions, among other things. For example, the dependency data could specify that the amplitude of a resonant frequency associated with the real-world 3D structure is dependent on the thickness of one or more specific regions of the real-world 3D structure as well as the properties of the materials found in the one or more specific regions. A particular set of dependency data could be downloaded from the Internet along with a corresponding stored 3D model or, alternatively, generated by the training engine 302 when optimizing a real-world 3D structure, as described in greater detail below in FIG. 5.

Upon accessing the structure database 304, the modification engine 306 first identifies the stored 3D model that is most similar to the 3D model 208. In one embodiment, the modification engine 306 implements a set of heuristics, a pattern-recognition algorithm, a neural network, a decision tree, a curve-fitting algorithm, a Kohonen Map, a Radial Basis Function, a K-means hierarchical clustering algorithm, a reinforcement learning algorithm, or another type of characterization algorithm and/or statistical data mining algorithm to identify the stored 3D model that is most similar to the 3D model 208.

The modification engine 306 then compares the response profile 312 to the design goals 210 to identify response characteristics in the response profile 312 that differ (diverge) significantly from corresponding response characteristics set forth in the design goals 210. For example, the modification engine 306 may compare the response profile 312 to the design goals 210 to determine that the amplitude of a particular resonant frequency in the response profile 312 is twice the amplitude of a corresponding resonant frequency set forth in the design goals 210.

Once determining that one or more corresponding response characteristics in the response profile 312 and the design goals 210 differ substantially, the modification engine 306 then extracts the dependency data associated with the stored 3D model 208 from the structure database 304. The modification engine 306 analyzes the extracted dependency data to identify specific regions of the 3D structure 108 on which the divergent response characteristics in the response profile 312 depend. Based on the dependency data, the modification engine 306 also determines whether adding material to or removing material from those specific regions of the 3D structure 108 would reduce the differences between the divergent response characteristics in the response profile 312 and the corresponding response characteristics set forth in the design goals 210.

The modification engine 306 then determines structural modifications to the specific regions of the 3D structure 108 that, when implemented by the multi-axis CAM unit 110, would cause the divergent response characteristics in the response profile 312 to more closely approximate the corresponding response characteristics set forth in the design goals 210. Such structural modifications may include adding material to or removing material from the specific regions of the 3D structure 108. The modification engine 306 then generates the modification data 308 that reflects those structural modifications.

Based on the modification data 308, the machine control translator 310 generates the machine control code 216. The machine control code 216 is then executed by the multi-axis CAM unit 110 to make the structural modifications indicated by the machine control code 216 to the 3D structure 108. In one embodiment, the modification engine 306 generates an updated 3D model 208 that reflects the structural modifications made to the 3D structure 108.

In further embodiments, once the multi-axis CAM unit 110 makes the modifications to the 3D structure 108 to generate a modified 3D structure, the structural analyzer 314 performs a vibrational analysis on the modified 3D structure, as described, in order to generate an updated response profile 312 based on the modified 3D structure. The modification engine 306 analyzes the updated response profile 312 to determine whether the modified 3D structure complies with the design goals 210. If the modified 3D structure does not comply with the design goals 210, then the modification engine 306 again accesses the structure database 304 and identifies a second stored 3D model that is most similar to the updated 3D model 208, as described above.

The modification engine 306 extracts additional dependency data associated with the second stored 3D model and, based on the additional dependency data, generates additional modification data 308. The additional modification data 308 reflects additional structural modifications to be made to the modified 3D structure using the techniques described above. The machine control translator 310 generates additional machine control code 216 based on the additional modification data 308, and the multi-axis CAM unit 110 then executes the additional machine control code 216 to make the additional structural modifications to the modified 3D structure. In this fashion, the multi-axis CAM unit 110 may cause the modified 3D structure to be brought into compliance with the design goals 210. Those skilled in the art will understand that the 3D structure 108 may be modified repeatedly based on one or more different sets of dependency data until the 3D structure 108 complies with the design goals 210.

While the modification engine 306 operates to generate the modification data 308, the training engine 302 operates to update the structure database 304. The training engine 302 is configured to include the 3D model 208 in the structure database 304 and to generate associated dependency data for the 3D model 208 for future use.

More specifically, the training engine 302 generates the dependency data for the 3D model 208 after the multi-axis CAM unit 110 makes the structural modifications to the 3D structure 108 and after the structural analyzer 314 generates an updated response profile. The training engine 302 compares the updated response profile to the response profile 312 and identifies response characteristics in the response profile 312 that changed once the multi-axis CAM unit 110 makes the structural modifications to the 3D structure 108. The training engine 302 also identifies the regions of the 3D structure 108 modified by the multi-axis CAM unit 110. The training engine 302 then generates the dependency data to reflect dependencies between the identified regions of the 3D model 208 and the response characteristics in the response profile 312 that changed because of the structural modifications made to the 3D structure 108.

Again, the training engine includes the 3D model 208 and the dependency data in the structure database 304. If the 3D structure 108 is modified repeatedly, then the training engine 302 repeatedly updates the structure database 304 based on the structural modifications made to the 3D structure 108 and the updated response profile generated following those structural modifications.

Figure 4A:
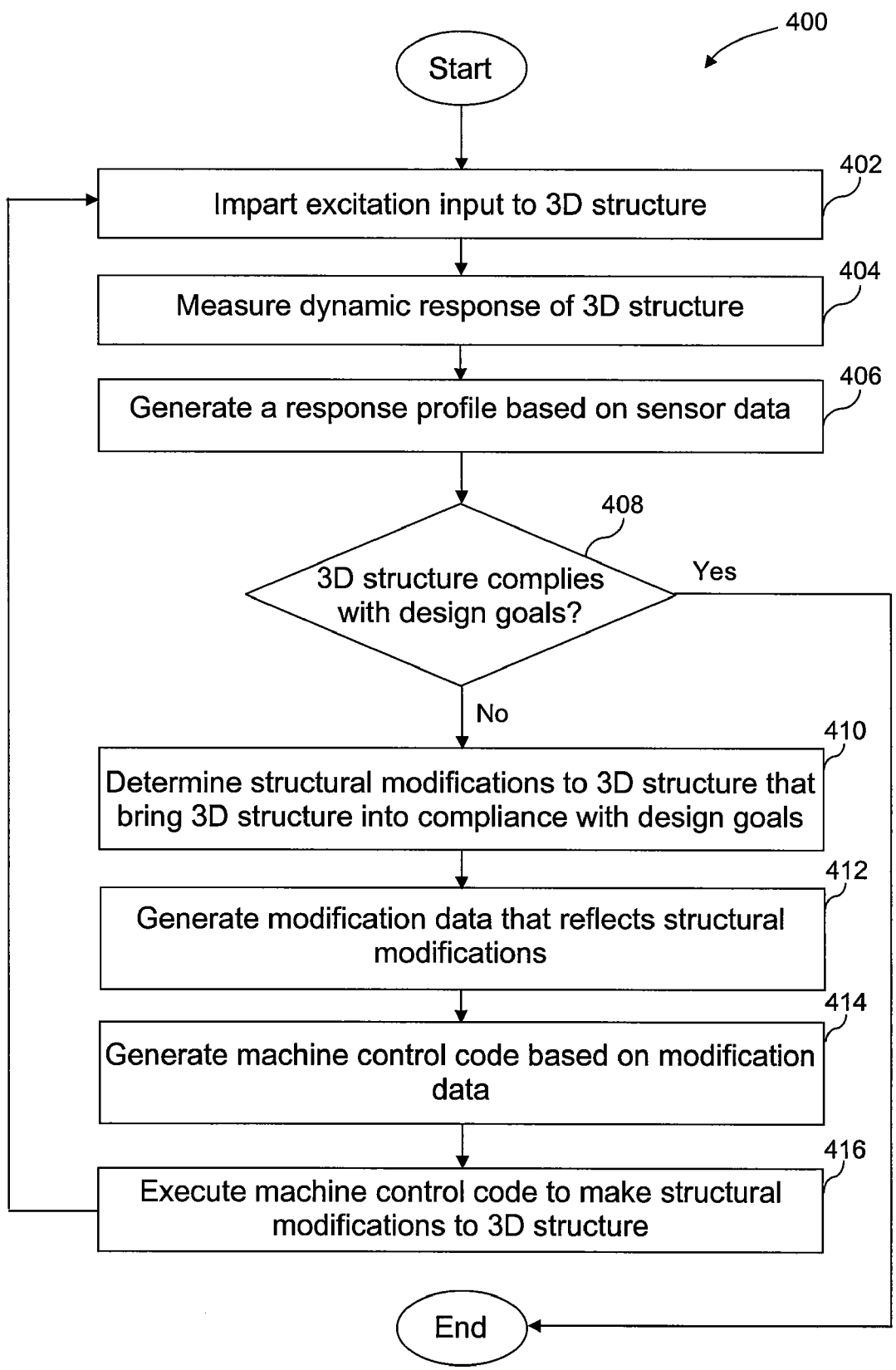
FIGS. 4A-4B set forth a flowchart of method steps for optimizing the vibrational characteristics of a structure, according to one embodiment of the invention.

FIG. 4A is a flowchart of method steps for optimizing the vibrational characteristics of a structure, according to one embodiment of the invention. Persons skilled in the art will understand that, although the method 400 is described in conjunction with the systems of FIGS. 1-3, any system configured to perform the method steps, in any order, is within the scope of the present invention.

As shown, the method 400 begins at step 402, where the actuation mechanism 104 imparts an excitation input to the 3D structure 108. The excitation input could be, for example, an acoustic sweep across a range of frequencies, an impulse force, or a sustained vibration, among others. The actuation mechanism 104 imparts the excitation input by executing the actuation mechanism commands 218. The 3D structure 108 produces a dynamic response after the actuation mechanism 104 imparts the excitation response to the 3D structure 108.

At step 404, the sensor array 106 measures the dynamic response produced by the 3D structure 108. The sensor array 106 includes one or more sensors configured to measure different quantities that reflect the dynamic response produced by the 3D structure 108. For example, the sensor array 106 could include one or more accelerometers each physically coupled to a particular location on the 3D structure 108 and configured to measure an acceleration value associated with that particular location. In another example, the sensor array 106 could include a microphone located at a distance from the 3D structure 108 and configured to measure the acoustic output of the 3D structure 108.

At step 406, the structural analyzer 314 within the structural optimization engine 214 generates the response profile 312. The response profile 312 includes different response characteristics that may characterize the dynamic response produced by the 3D structure 108. For example, the response profile 312 could include one or more resonant frequencies, one or more impedance/admittance values, a quality factor Q, or a transfer function associated with the 3D structure 108, among others.

At step 408, the modification engine 306 within the structural optimization engine 214 determines whether the 3D structure 108 complies with the design goals 210. When determining whether the 3D structure 108 complies with the design goals 210, the modification engine 306 determines whether response characteristics included in the response profile 312 are sufficiently similar to corresponding response characteristics set forth in the design goals 210. For example, the modification engine 306 could compare the amplitude of a particular resonant frequency in the response profile 312 to the amplitude of a corresponding resonant frequency in the design goals 210. If the difference between the two values is less than a threshold value, then the modification engine 306 would determine that the 3D structure 108 complies with the design goals 210. If the difference is greater than a threshold value, then the modification engine 306 would determine that the 3D structure 108 does not comply with the design goals 210. In one embodiment, multiple response characteristics are compared when determining whether the 3D structure 108 complies with the design goals 210.

If the 3D structure 108 complies with the design goals 210, then the method 400 terminates. If the 3D structure 108 does not comply with the design goals 210, then the method 400 advances to step 410. At step 410, the modification engine 306 within the structural optimization engine 214 determines structural modifications that, if made to the 3D structure 108, bring the 3D structure 108 into compliance with the design goals 210. Step 410 of the method 400 is described in greater detail below in FIG. 4B.

At step 412, the modification engine 306 generates the modification data 308 that reflects the structural modifications to be made to the 3D structure 108. The modification data 308 specifies the removal of material from or the addition of material to the 3D structure 108. At step 414, the machine control translator 310 translates the modification data 308 into the machine control code 216. The machine control code 216 may be computational numerical control (CNC) code or G-code, among others. The machine control code 216 specifies regions of the 3D structure 108 where material is to be removed from and/or added to the 3D structure 108 and can be executed by the multi-axis CAM unit 210 to remove material from and/or add material to the 3D structure 108.

At step 416, the multi-axis CAM unit 110 executes the machine control code 216 to make the structural modifications to the 3D structure 108. By executing the machine control code 216, the multi-axis CAM unit 210 may bring the 3D structure into compliance with the design goals 210. The method 400 then returns to step 402, described above.

The structural optimization engine 214 may implement the method 400 to perform steps 402, 404, 406, 408, 410, 412, 414, and 416 repeatedly. When the modification engine 306 within the structural optimization engine 214 determines that the 3D structure 108 complies with the design goals 210, the structural optimization engine 214 may stop performing the method 400. When the structural optimization engine 214 repeats the method steps of the method 400, the training engine 302 within the structural optimization engine 214 updates the structure database 304, as described in greater detail below in FIG. 5.

Figure 4B:
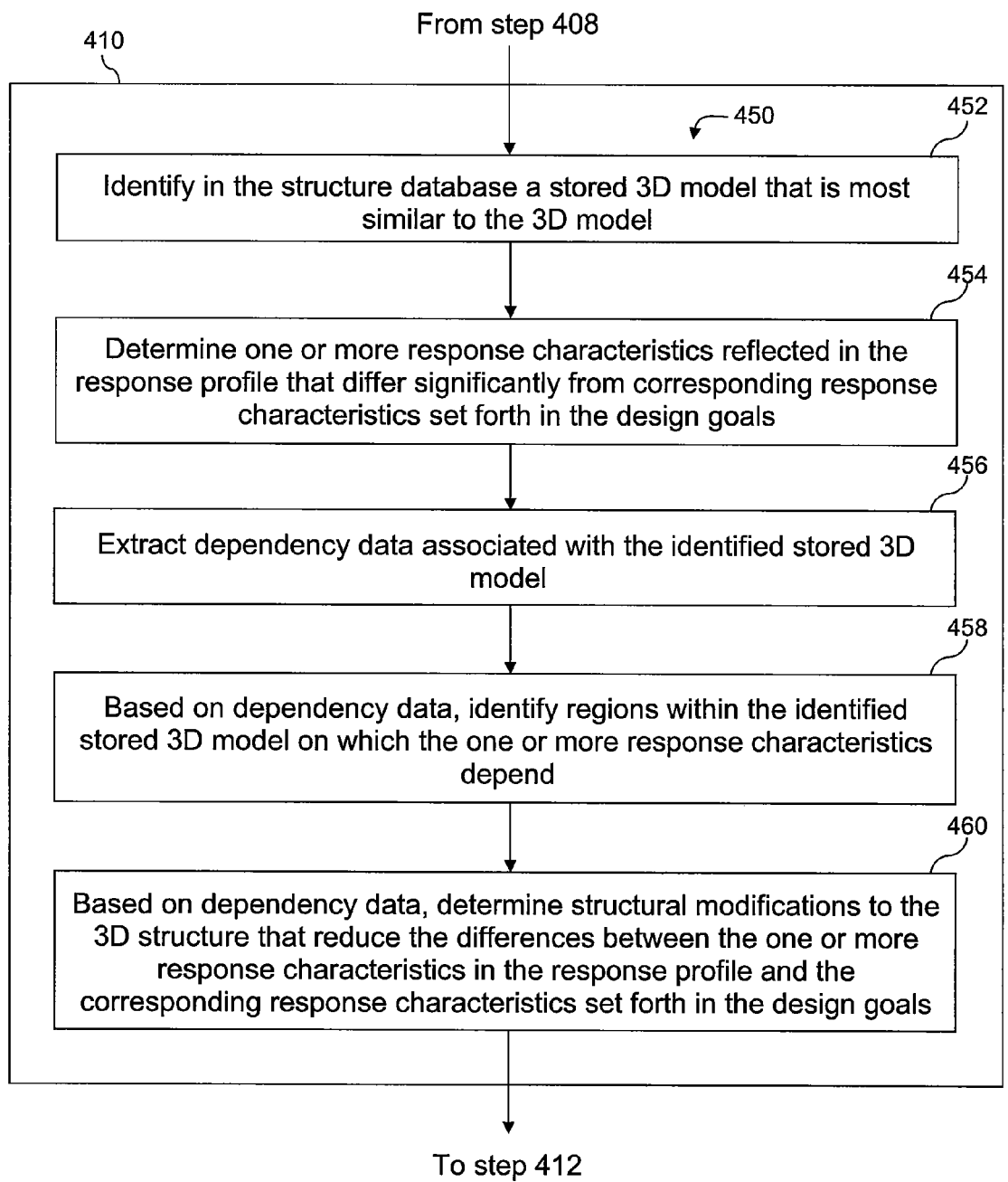

FIG. 4B is a flowchart of method steps for determining structural modifications to the 3D structure 108 that bring the 3D structure 108 into compliance with the design goals 210. Persons skilled in the art will understand that, although the method 450 is described in conjunction with the systems of FIGS. 1-3, any system configured to perform the method steps, in any order, is within the scope of the present invention. The method 450 is implemented when step 410 of the method 400 is performed, as described above in FIG. 4A.

The method 450 begins at step 452, where the modification engine 306 identifies a stored 3D model in the structure database 304 that is most similar to the 3D model 208. In one embodiment, the modification engine 306 implements a set of heuristics, a pattern-recognition algorithm, a neural network, a decision tree, a curve-fitting algorithm, a Kohonen Map, a Radial Basis Function, a K-means hierarchical clustering algorithm, a reinforcement learning algorithm, or another type of characterization algorithm and/or statistical data mining algorithm to identify the stored 3D model that is most similar to the 3D model 208.

At step 454, the modification engine 306 determines one or more response characteristics reflected in the response profile 312 that differ (diverge) significantly from the corresponding response characteristics set forth in the design goals 210. For example, the modification engine 306 may compare the response profile 312 to the design goals 210 to determine that the amplitude of a particular resonant frequency in the response profile 312 is twice the amplitude of a corresponding resonant frequency in the design goals 210.

At step 456, the modification engine 306 extracts the dependency data from the structure database 304 that is associated with the identified stored 3D model. The extracted dependency data indicates dependencies between the response characteristics of a 3D structure represented by the identified stored 3D model, such as the 3D structure 108, and the amounts of the different materials in specific regions of that 3D structure. For example, the extracted dependency data could specify that the amplitude of a particular resonant frequency associated with the 3D structure 108 is dependent on the thickness of one or more specific regions of the 3D structure 108.

At step 458, the modification engine 306 identifies regions within the identified stored 3D model on which the divergent response characteristics depend based on the dependency data. For example, if the stored 3D model represents a guitar, and the divergent response characteristics include a specific quality factor Q associated with the guitar, then the dependency data may indicate that the specific quality factor Q of the guitar depends on the amount of material in the bridge of the guitar.

At step 460, the modification engine 306 analyzes the extracted dependency data to determine structural modifications to the 3D structure 108 that reduce the differences between the divergent response characteristics in the response profile 312 and the corresponding response characteristics set forth in the design goals 210. Returning to the above example, the modification engine 306 could determine that by reducing the amount of material in the bridge of the guitar, the specific quality factor Q of the guitar could be increased. In this fashion, the specific quality factor Q of the guitar may better approximate a corresponding quality factor Q set forth in the design goals 210.

After step 460 of the method 450 is implemented, the method 450 terminates and step 410 of the method 400 is complete, thereby allowing the method 400 to proceed to step 412, as described in FIG. 4A.

Figure 5:
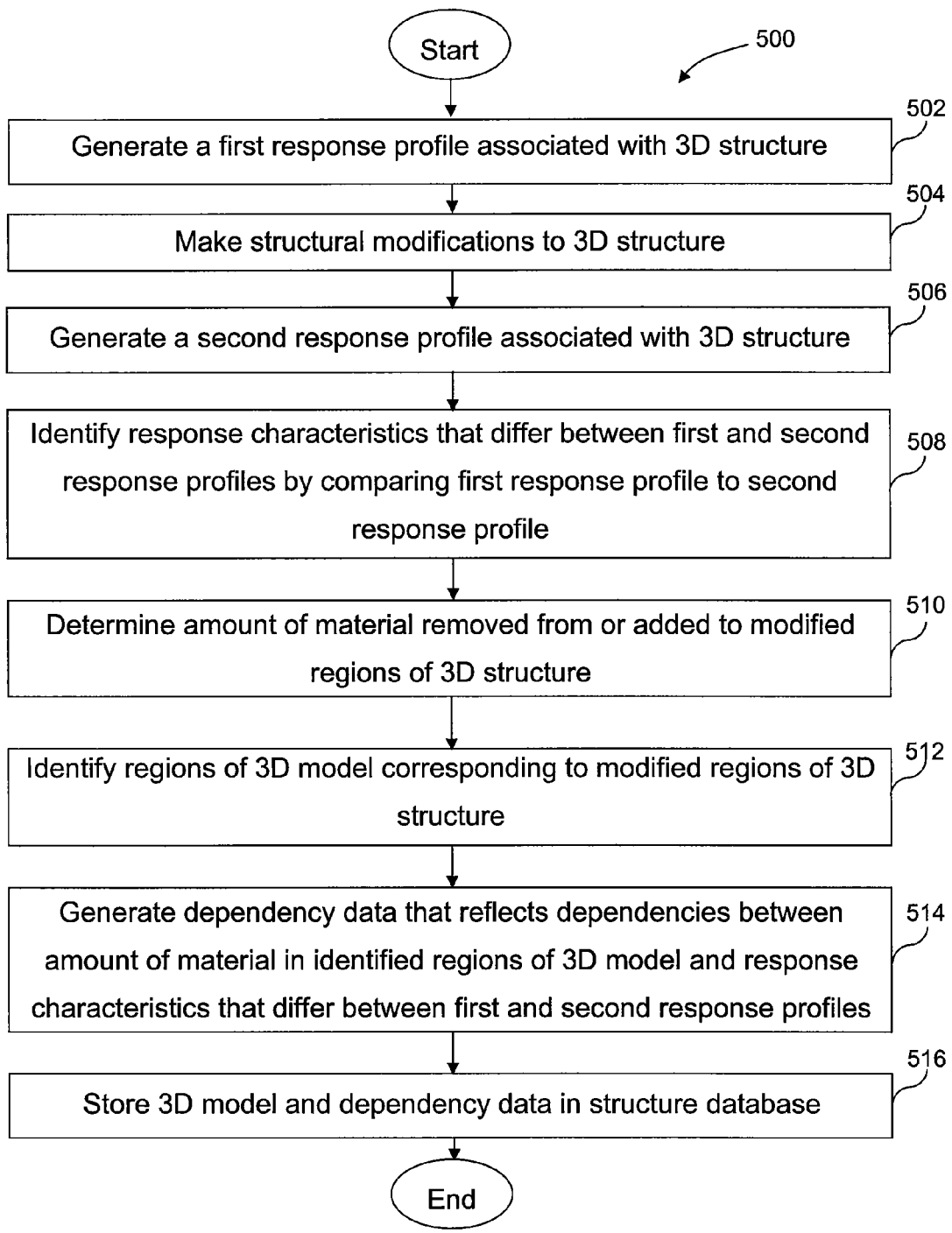
FIG. 5 is a flowchart of method steps for updating a structure database, according to one embodiment of the invention.

FIG. 5 is a flowchart of method steps for updating the structure database 304, according to one embodiment of the invention. Persons skilled in the art will understand that, although the method 500 is described in conjunction with the systems of FIGS. 1-3, any system configured to perform the method steps, in any order, is within the scope of the present invention.

As shown, the method 500 begins at step 502, where the structural analyzer 314 within the structural optimization engine 214 generates a first response profile for the 3D structure 108. The structural analyzer 314 transmits the actuation mechanism commands 218 to the actuation mechanism 104. Based on the actuation mechanism commands 218, the actuation mechanism 104 imparts an excitation input to the 3D structure 108. The 3D structure 108 then produces a dynamic response. Sensors in the sensor array 106 measure the dynamic response produced by the 3D structure 108 and output the sensor data 212 to the computing device 102.

Based on the sensor data 212 and the actuation mechanism commands 218, the structural analyzer 314 then generates the first response profile. The first response profile includes response characteristics of the 3D structure 108 that are based on the dynamic response produced by the 3D structure 108. The response characteristics may include one or more resonant frequencies, one or more impedance/admittance values, a quality factor Q, a frequency spectrum, or spectral density data associated with the 3D structure 108, among others.

At step 504, the 3D multi-axis CAM unit 110 makes structural modifications to the 3D structure 108 based on the machine control code 216. As described in FIGS. 2-4B, the structural optimization engine 214 determines structural modifications that, if made to the 3D structure 108, bring the 3D structure into compliance with the design goals 210. The modification engine 306 generates the modification data 308 that reflects these structural modifications. The machine control translator 310 then generates the machine control code 216 based on the modification data 308. The multi-axis CAM unit 110 then executes the machine control code 216 to make the structural modifications to the 3D structure 108.

At step 506, the structural analyzer 314 generates a second response profile for the 3D structure 108. The structural analyzer 314 generates the second response profile in a substantially similar manner as described in step 502. However, since structural modifications have been made to the 3D structure 108, when the actuation mechanism 104 imparts the excitation input to the 3D structure 108, the 3D structure 108 produces a current dynamic response that may be unique compared to previous dynamic responses. The structural analyzer 314 generates the second response profile based on the current dynamic response produced by the 3D structure 108.

At step 508, the training engine 302 within the structural optimization engine 214 identifies response characteristics included in the first and second response profiles that differ by comparing each response characteristic included in the first response profile to a corresponding response characteristic included in the second response profile. For example, when the response profile includes a spectral density plot, the training engine 302 could compare the amplitude of a particular frequency in the first response profile to the amplitude of a corresponding frequency included in the second response profile and then determine that the amplitude of that particular frequency decreased by 50% between the first and second response profiles.

At step 510, the training engine 302 analyzes the modification data 308 to determine the amounts of the different materials removed from or added to the regions of the 3D structure 108 modified by the multi-axis CAM unit 110 at step 504. In one embodiment, the training engine 302 determines the volume of different materials removed from or added to the modified regions of the 3D structure 108. In another embodiment, the training engine 302 may determine a change in thickness of the modified regions of the 3D structure 108.

At step 512, the training engine 302 identifies regions of the 3D model 208 that correspond to the modified regions of the 3D structure 108. The training engine 302 identifies the regions of the 3D structure 108 to which structural modifications were made by the multi-axis CAM unit 110 at step 502 and then identifies corresponding regions of the 3D model 208.

At step 514, the training engine 302 generates dependency data that reflects dependencies between the amounts of the different materials in the identified regions of the 3D model 208 and the response characteristics that differ between the first and second response profiles. In one embodiment, the dependency data specifies a dependency between the volume of the materials in the identified regions of the 3D model 208 and the response characteristics that differ between the first and second response profiles. In another embodiment, the dependency data may specify a dependency between the thickness of material in the identified regions of the 3D model 208 and the response characteristics that differ between the first and second response profiles.

At step 514, the training engine 302 stores the 3D model 208 and the dependency data together in the structure database 304. The modification engine 306 may then access the 3D model 208 and the dependency data when subsequently generating additional modification data for the 3D structure 108 or for another 3D structure.

While the foregoing descriptions of FIGS. 2-5 is directed towards the system 100 described in FIG. 1, alternative implementations of the system 100 are also possible, as described in greater detail below in FIG. 6.

FIG. 6 is a conceptual diagram of another system 600 configured to implement one or more aspects of the invention. As shown, the system 600 includes some of the same components as the system 100. In addition, the system 600 further includes a CAM implement 602 coupled to the multi-axis CAM unit 110. The multi-axis CAM unit 110 controls the CAM implement 602 and may cause the CAM implement 602 to make structural modifications to the 3D structure 108 by adding material to and/or removing material from the 3D structure 108. For example, if the multi-axis CAM unit 110 is a router, and the CAM implement 602 is a cutting bit, then the multi-axis CAM unit 110 could cause the CAM implement 602 to remove material from the 3D structure 108.

The multi-axis CAM unit 110 may also cause the CAM implement 602 to impart an excitation input to the 3D structure 108. For example, the multi-axis CAM unit 110 could cause the CAM implement 602 to impart an impulse force on the 3D structure 108. The excitation input may be imparted to the 3D structure 108 while the CAM implement 602 makes structural modifications on the 3D structure 108 or independently of the CAM implement 602 making structural modifications to the 3D structure 108.

The CAM implement includes a sensor array 604. The sensor array 604 includes some or all of the same sensors as the sensor array 106 described in FIG. 1. The sensor array 604 is configured to measure the dynamic response produced by the 3D structure 108 after the CAM implement 602 imparts an excitation input to the 3D structure 108. The sensor array 604 may also be configured to measure different quantities associated with the CAM implement 604, such as, for example, a torque value or a force value.

The sensor array 604 outputs sensor data to the computing device 102. The sensor array could, for example, transmit the sensor data to the computing device 102 via a wireless connection, or, alternatively, transmit the sensor data to the computing device 102 via the multi-axis CAM unit 110, among others. Based on the sensor data, the computing device 102 determines structural modifications that can be made to the 3D structure 108 in order to bring the 3D structure 108 into compliance with design goals set for the 3D structure 108, as previously described in FIGS. 2-4. For example, the computing device 102 could include a structural optimization engine that is substantially similar to the structural optimization engine 214 of FIGS. 2-3. The structural optimization engine could generate machine control code that, when executed by the multi-axis CAM unit 110, causes the multi-axis CAM unit 110 to make the structural modifications to the 3D structure 108.

According to the techniques described herein, the computing device 102 may cause the multi-axis CAM unit 110 to optimize the vibrational characteristics of the 3D structure 108. Persons of ordinary skill in the art will understand that the computing device 102 may cause the multi-axis CAM unit 210 to make one or more distinct structural modifications to the 3D structure 108, in one or more different passes, and with varying degrees of material removal and/or addition. For example, the computing device 102 could cause the multi-axis CAM unit 110 to remove a decreasing amount of material from the 3D structure 108 in order to fine-tune the 3D structure 108.

In sum, a computing device performs a vibrational analysis of a three-dimensional (3D) structure to determine whether the 3D structure complies with design goals set for the 3D structure. When the 3D structure does not comply with the design goals, the computing device causes a multi-axis CAM unit to make structural modifications to the 3D structure to bring the 3D structure into compliance with the design goals.

When performing the vibrational analysis, the computing device causes an actuation mechanism to impart an excitation input to the 3D structure. The 3D structure produces a dynamic response, and a sensor array coupled to the computing device measures various quantities associated with the dynamic response. The sensor array outputs sensor data that reflects the dynamic response to the computing device. The computing device includes a structural optimization engine that analyzes a 3D model of the 3D structure, the design goals set for the 3D structure, and the sensor data. Based on the 3D model and the sensor data, the structural optimization engine determines whether the 3D structure complies with the design goals.

When the 3D structure does not comply with the design goals, the structural optimization engine accesses dependency data that indicates dependencies between specific regions of the 3D structure and response characteristics associated with the dynamic response produced by the 3D structure. The structural modification engine then determines structural modifications that can be made to the 3D structure in order to manipulate those response characteristics to bring the 3D structure into compliance with the design goals. The computing device generates machine control code that reflects the structural modifications. A multi-axis computer-aided manufacturing (CAM) unit executes the machine control code to make the structural modifications to the 3D structure, thereby bringing the 3D structure into compliance with the design goals.

Advantageously, a 3D structure having precise vibrational characteristics can be generated. The 3D structure can be modified until the 3D structure complies with design goals set for the 3D structure. In addition, specific vibrational characteristics of the 3D structure can be identified and manipulated by making precise structural modifications to the 3D structure, thereby allowing the 3D structure to be fine-tuned.

While the forgoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention.

In view of the foregoing, the scope of the present invention is determined by the claims that follow.

What is claimed is:

1. A computer-implemented method for optimizing the vibrational characteristics of a three-dimensional (3D) structure, the method comprising the steps of:
   imparting an excitation input to the 3D structure;
   measuring a dynamic response produced by the 3D structure;
   determining that the 3D structure does not comply with one or more design goals set for the 3D structure by:
      generating a response profile for the 3D structure based on the dynamic response produced by the 3D structure that includes at least one response characteristic that corresponds to a response characteristic included in the one or more design goals,
      comparing the at least one response characteristic included in the response profile to the corresponding response characteristic included in the one or more design goals, and
      determining that the at least one response characteristic included in the response profile differs from the corresponding response characteristic included in the one or more design goals;
   determining at least one structural modification to be made to the 3D structure to bring the 3D structure into compliance with the one or more design goals; and
   causing a multi-axis computer-aided manufacturing (CAM) unit to make the at least one structural modification to the 3D structure.

2. The method of claim 1, wherein the design goals include at least one of a quality factor Q, one or more resonant frequencies, one or more impedance values, one or more admittance values, or a transfer function.

3. The method of claim 1, wherein the step of determining the at least one structural modification to be made to the 3D structure to bring the 3D structure into compliance with the one or more design goals comprises the steps of:
   comparing a 3D model of the 3D structure to one or more stored 3D models included in a structure database to determine a most similar stored 3D model;
   extracting dependency data associated with the most similar stored 3D model that indicates a dependency between a first response characteristic associated with the stored 3D model and an amount of material in the first region of the stored 3D model, wherein the first response characteristic associated with the stored 3D model corresponds to the at least one response characteristic included in the response profile, and the first region of the stored 3D model corresponds to a specific region of the 3D structure; and
   generating modification data that reflects the at least one structural modification to be made to the specific region of the 3D structure based on the dependency data, wherein the at least one structural modification reduces the difference between the at least one response characteristic included in the response profile and the corresponding response characteristic included in the design goals.

4. The method of claim 3, wherein the step of comparing the 3D model of the 3D structure to one or more stored 3D models included in the structure database comprises implementing one or more of a set of heuristics, a pattern-recognition algorithm, a neural network, a decision tree, a curve-fitting algorithm, a Kohonen Map, a Radial Basis Function, a K-means hierarchical clustering algorithm, or a reinforcement learning algorithm to determine the stored 3D model that is most similar to the 3D model of the 3D structure.

5. The method of claim 3, wherein the step of causing the multi-axis CAM machine to make the at least one structural modification to the 3D structure further comprises the steps of:
   generating machine control code based on the modification data that comprises G-code or computational numerical control (CNC) code; and
   executing the machine control code to remove material from or add material to the specific region of the 3D structure.

6. The method of claim 1, wherein the step of imparting the excitation input to the 3D structure is performed by a shaker, a force hammer, a magnetic actuator, or a loudspeaker.

7. The method of claim 1, wherein the step of measuring a dynamic response produced by the 3D structure is performed by a sensor array that includes at least an accelerometer, a strain gauge, a force gauge, an air velocity sensor, or a microphone.

8. The method of claim 1, wherein the steps of imparting an excitation input, measuring a dynamic response, determining that the 3D structure does not comply with one or more design goals, determining at least one structural modification to be made to the 3D structure, and causing a multi-axis CAM unit to make the at least one structural modification are repeated until the 3D structure complies with the one or more design goals.

9. A non-transitory computer-readable medium that, when executed by a processor, optimizes the vibrational characteristics of a three-dimensional (3D) structure by performing the steps of:
   causing an excitation input to be imparted to the 3D structure;
   receiving a measurement of a dynamic response produced by the 3D structure;
   determining that the 3D structure does not comply with one or more design goals set for the 3D structure by:
      generating a response profile for the 3D structure based on the dynamic response produced by the 3D structure that includes at least one response characteristic that corresponds to a response characteristic included in the one or more design goals,
      comparing the at least one response characteristic included in the response profile to the corresponding response characteristic included in the one or more design goals, and
      determining that the at least one response characteristic included in the response profile differs from the corresponding response characteristic included in the one or more design goals;
   determining at least one structural modification to be made to the 3D structure to bring the 3D structure into compliance with the one or more design goals; and
   causing a multi-axis CAM unit to make the at least one structural modification to the 3D structure.

10. The non-transitory computer-readable medium of claim 9, wherein the design goals include at least one of a quality factor Q, one or more resonant frequencies, one or more impedance values, one or more admittance values, or a transfer function.

11. The non-transitory computer-readable medium of claim 9, wherein the step of determining the at least one structural modification to be made to the 3D structure to bring the 3D structure into compliance with the one or more design goals comprises the steps of:

comparing a 3D model of the 3D structure to one or more stored 3D models included in a structure database to determine a most similar stored 3D model;

extracting dependency data associated with the most similar stored 3D model that indicates a dependency between a first response characteristic associated with the stored 3D model and an amount of material in the first region of the stored 3D model, wherein the first response characteristic associated with the stored 3D model corresponds to the at least one response characteristic included in the response profile, and the first region of the stored 3D model corresponds to a specific region of the 3D structure; and generating modification data that reflects the at least one structural modification to be made to the specific region of the 3D structure based on the dependency data, wherein the at least one structural modification reduces the difference between the at least one response characteristic included in the response profile and the corresponding response characteristic included in the design goals.

12. The non-transitory computer-readable medium of claim 11, wherein the step of comparing the 3D model of the 3D structure to one or more stored 3D models included in the structure database comprises implementing one or more of a set of heuristics, a pattern-recognition algorithm, a neural network, a decision tree, a curve-fitting algorithm, a Kohonen Map, a Radial Basis Function, a K-means hierarchical clustering algorithm, or a reinforcement learning algorithm to determine the stored 3D model that is most similar to the 3D model of the 3D structure.

13. The non-transitory computer-readable medium of claim 11, wherein the step of causing the multi-axis CAM machine to make the at least one structural modification to the 3D structure further comprises the steps of:
generating machine control code based on the modification data that comprises G-code or computational numerical control (CNC) code; and
causing the multi-axis CAM unit to execute the machine control code to remove material from or add material to the specific region of the 3D structure.

14. The non-transitory computer-readable medium of claim 9, wherein the steps of imparting an excitation input, measuring a dynamic response, determining that the 3D structure does not comply with one or more design goals, determining at least one structural modification to be made to the 3D structure, and causing a multi-axis CAM unit to make the at least one structural modification are repeated until the 3D structure complies with the one or more design goals.

15. A system for optimizing the vibrational characteristics of a 3D structure, including:
an actuation mechanism configured to impart an excitation input to the 3D structure;
a sensor array configured to measure a dynamic response produced by the 3D structure;
a multi-axis CAM unit configured to add material to or remove material from the 3D structure via a CAM implement; and
a computing device that includes:
one or more input/output I/O devices,
a processor, and
a memory that includes a structural optimization engine configured to perform the steps of:
causing the actuation mechanism to impart the excitation input to the 3D structure,
receiving a measurement of the dynamic response produced by the 3D structure from the sensor array,
determining that the 3D structure does not comply with one or more design goals set for the 3D structure by:
generating a response profile for the 3D structure based on the dynamic response produced by the 3D structure that includes at least one response characteristic that corresponds to a response characteristic included in the one or more design goals,
comparing the at least one response characteristic included in the response profile to the corresponding response characteristic included in the one or more design goals, and
determining that the at least one response characteristic included in the response profile differs from the corresponding response characteristic included in the one or more design goals;
determining at least one structural modification to be made to the 3D structure to bring the 3D structure into compliance with the one or more design goals, and
causing the multi-axis CAM unit to make the at least one structural modification to the 3D structure.

16. The system of claim 15, wherein the design goals include at least one of a quality factor Q, one or more resonant frequencies, one or more impedance values, one or more admittance values, or a transfer function.

17. The system of claim 15, wherein the step of determining the at least one structural modification to be made to the 3D structure to bring the 3D structure into compliance with the one or more design goals comprises the steps of:
comparing a 3D model of the 3D structure to one or more stored 3D models included in a structure database to determine a most similar stored 3D model;
extracting dependency data associated with the most similar stored 3D model that indicates a dependency between a first response characteristic associated with the stored 3D model and an amount of material in the first region of the stored 3D model, wherein the first response characteristic associated with the stored 3D model corresponds to the at least one response characteristic included in the response profile, and the first region of the stored 3D model corresponds to a specific region of the 3D structure; and
generating modification data that reflects the at least one structural modification to be made to the specific region of the 3D structure based on the dependency data, wherein the at least one structural modification reduces the difference between the at least one response characteristic included in the response profile and the corresponding response characteristic included in the design goals.

* * * * *